United States Patent [19]

Dahlgren

[11] Patent Number: 4,781,805
[45] Date of Patent: Nov. 1, 1988

[54] METHOD FOR CONTROLLING POLLUTION AND REDUCING CALCIUM CONCENTRATION IN AQUEOUS BODIES

[76] Inventor: Vincent Dahlgren, 320 Osborne St., Vista, Calif. 92083

[21] Appl. No.: 156,334

[22] Filed: Feb. 16, 1988

[51] Int. Cl.⁴ ............................................. C02F 1/46
[52] U.S. Cl. ..................................... 204/149; 204/152
[58] Field of Search ................................. 204/149, 152

[56] References Cited

U.S. PATENT DOCUMENTS

| | | | |
|---|---|---|---|
| 3,192,146 | 6/1965 | Vellas | 204/149 |
| 3,334,035 | 8/1967 | Dews | 204/149 |
| 3,402,120 | 9/1968 | Allen | 204/149 |
| 3,458,414 | 7/1969 | Crane | 204/149 |
| 3,752,747 | 8/1973 | Traharne | 204/149 |

Primary Examiner—T. M. Tufariello

[57] ABSTRACT

An improved method of controlling algal and bacterial pollution, as well as reducing the concentration of dissolved calcium, in a swimming pool, without the necessity of adding electrolytes thereto, involving the steps of:

(a) conveying a stream of water from the swimming pool to an enclosed area and back to the pool;
(b) providing a pair of spaced-apart electrodes in the enclosed area through which the water is to pass, the electrodes being chemically active and made from mixtures of silver and aluminum alloy containing from about 0.5 to about 5.0 per cent by weight silver and the valance being aluminum alloy;
(c) providing a source of alternating electrolytic potential to the electrodes to generate an energy field through the water stream between the electrodes having an rms voltage range from about 25 to about 35 volts and a frequency of alternation of 60 cycles per second to toxify the bacteria and algae in the water and to agglomerate the dissolved calcium into filterable agglomerates; and,
(d) providing a filter downstream from the electrodes in the enclosed area for filtering the water as it passes from the electrodes and before it returns to the swimming pool.

8 Claims, 1 Drawing Sheet

METHOD FOR CONTROLLING POLLUTION AND REDUCING CALCIUM CONCENTRATION IN AQUEOUS BODIES

BACKGROUND OF THE INVENTION

1. Field of the Invention

This invention pertains to the field of pollution control. More specifically, it pertains to processes for controlling algal and bacterial formations in aqueous bodies and, at the same time, for treating the dissolved water hardness and changing it into a form that permits removal by filtration. This invention finds specific application in controlling algal and bacterial growth and reducing calcium content in public and private swimming pools.

2. Description of the Prior Art

Algal and bacterial pollution are born of microscopic organisms. These organisms are carried in the air, on the skin of humans and animals and are found in virtually all bodies of liquid. Sunlight operates to catalyze the growth of algae and bacteria through cellular multiplication.

Calcium is found in virtually all bodies of water. It is dissolved by the action of rain on calcium-containing rock and carried by creeks and rivers, where more is dissolved from calcium-containing bedrock, into reservoirs, lakes and oceans. Where water undergoes extraction or biological control processes, such as in treatments to alter the growth of algal and bacterial growth, dissolved calcium tends to come out of solution and inhibit or spoil the treatment.

In aqueous bodies, the combination of sunlight and certain chemicals cause significant growth of algae and bacteria through photosynthesis. Fertilizer nitrates carried in water through run-off from farm fields and gardens make their way into creeks, reservoirs and rivers from which drinking water is obtained. Process foods contain nitrates and other chemicals that pass unchanged through digestive systems and sewage treatment systems to ultimately find their way back to drinking water reservoirs. Direct sunlight and that filtered through the clouds, in the presence of these chemicals, promote tremendous growth of algae and bacteria present in the water that ultimately impart undesirable taste in the water, and noxious fumes deteriorate and damage water purification systems and, in some cases, bind and clog filters and other cleansing medium.

Depollution of aqueous bodies has been generally a war of chemicals. Chemicals are added to deter further growth of algae and bacteria; however, these chemicals are as foreign to the human body as are the algae and bacteria and often cause deleterious affects on general health. While some chemicals have been proven exceptionally efficacious in stopping and even reversing the growth of algae and bacteria, these chemicals impart their own brand of noxious taste and odors to the water so that the final result is a less invasive water but just as obnoxious as it was when it contained the algae and bacteria.

Specifically, in aqueous bodies like swimming pools, constant exposure to sunlight maximizes growth of the minute quantities of algae and bacteria found therein. Even on overcast days, the light is sufficient to bring about grown of these minute particles carried into the water by wind, rain and on the swimmer's body and swim suit.

Conventional methods of maintaining low levels of pollution in swimming pools is to pour large quantities of aqueous solutions of chlorine-bearing compounds and oxygen-bearing compounds into the water to kill the algae and bacteria and then filter the dead material from the water. However, these chemicals degrade with time and exposure to light and must be replaced on a periodic basis to maintain the potential to kill newly introduced algae and bacteria. Not only are these chemicals expensive bust they pose substantial hazards to handlers. Filling a pool with hazardous chemicals of this type poses danger to not only the person adding the materials to the pool but to those who use the pool after the addition of the materials. Over-treatment is difficult to perceive visually and can lead to skin rashes, eye infections and worse diseases for those who use the pool after the over-treatment.

Recently, advances have been found in pollution control using spark and energy discharges between electrodes, see U.S. Pat. No. 3,402,120. Alternating electrical current has been found useful in controlling algal and bacterial growth in aqueous solutions with no harmful residual effects produced by the electrical current itself. These treatments, however, require the pre-addition of electrolyte compounds to the aqueous bodies and swimming pools to enhance the effect of the electrical energy, see U.S. Pat. No. 3,192,146. Sodium chloride is a common compound added to water preparatory to exposing the water to electrical discharge to control pollution, see U.S. Pat. No. 3,458,414. The deleterious effects of the sodium ion on the body are widely known and are sought to be avoided by many people, especially those with heart disease. Other treatments involving electricity and hypochlorite salts are also known to be efficacious, see U.S. Pat. No. 3,344,035; however, those salts may be deleterious to one's health.

In all of these prior art treatments, calcium dissolved in the body of water to be treated has tended to foul the reactions and interfere with the processes. Calcium tends to be at a saturation level because of the water's constant exposure to calcium-bearing materials such as rock and concrete. As soon as chemical alteration is undertaken, calcium begins to come out of solution as solid material, coating electrodes, plating filters and otherwise decreasing the effectiveness of the processes.

Silver has been found useful to kill bacteria when combined in filters through which the bacteria-laden water is passed. These filters, however, clog with use and require replacement. Thus, the silver is lost with the discarded filter and the cost of such a treatment is prohibitive. In other developments, silver ions in concentrations of three parts per billion, have been found to maintain concentrations of bacteria at acceptable levels. The addition of calcium hypochlorite as a supplement is needed along with a silver concentration and this compound also poses certain health risks in addition to becoming an adverse party by coating electrodes and damaging the electrolysis program. In addition, widespread use of silver in large bodies of water can be a cost problem.

A method has been found to use one inert electrode and one active electrode for controlling pollution in aqueous bodies, see U.S. Pat. No. 3,752,747. The active electrode is one that, upon being exposed to an electric potential, will introduce metallic ions into the aqueous body; an inert electrode will not introducing metallic ions into the body. Copper ions have been found to be very toxic to a wide range or algae and bacteria. In the aforesaid patent, one active electrode of copper and one inactive electrode is placed in spaced-apart relation in the aqueous body and an electrolytic potential applied therebetween where the discharge kills the algae formations and the copper ions kill the bacteria and the algae clinging to objects outside the electric field. The invention requires the use of one inert electrode so that when the concentration of copper ions is found to be of a sufficient amount to kill the bacteria and algae, the polarity is reversed between the electrodes to prevent further introduction of copper ions into the aqueous body.

A substantial problem has arisen from the use of this method, especially where the sides and bottom of the aqueous body are covered with aesthetically pleasing finishes. Copper ions stain light colored surfaces such as those found in the sides and bottoms of most swimming pools. While the copper is needed to toxify the algae and bacteria, its use in those concentrations causes so much staining that the pool owner would rather go back to using the chlorine-based chemicals and maintaining a goodlooking swimming pool than to keep re-painting or re-covering the stained sides of his swimming pool.

Recently, this inventor has discovered that the introduction of silver ions from silver/aluminum alloy electrodes under direct current conditions, where the polarity of the current is periodically reversed between them, provides efficacious control of algal and bacterial growth without the staining of the containment walls, such as the sides and bottoms of the swimming pool, as well as even utilization of the silver content in each electrode, reference my patent application Ser. No. 07/120,387; filing date 11/13/87; METHOD FOR CONTROLLING POLLUTION. In the practice of this invention, it has been noticed that, when direct current is used and either the polarity is held constant, reversed only during every other periodic application of power, or reversed at a low frequency, i.e., every five minutes or so, calcium begins to accumulate on the electrode in the form of a hard, impervious coating, being drawn to the electrode by the population of free electrons that gather at the negative polarity. The calcium thereafter remains on the electrode even after the polarity of the electrode has been reversed.

Such an accumulation gradually deteriorates the effectiveness of the electrode to pass current and free silver ions into the water. This results in the electrode needing periodic cleaning. Scraping the electrode with a knife or other sharp object, while being one method of cleaning, involves significant handling and possible gouging or damage to the electrode. Efficient cleaning of the electrode has been made possible by soaking it over night in a cleaning solution containing a deoxidizer/descaler such as #CC-3000, manufactured by Charles A Crosbie Laboratories, Inc., 1851 Randolph Street, Los Angeles, Calif. 90001.

This use of silver/aluminum alloy electrodes with either direct current or periodically reversed direct current is still quite useful because it not only controls algal and bacterial growth, but at the same time, removes calcium from the water resulting in a "softer" water that, as is generally known, is milder to the skin and promotes healing of skin maladies such as cuts, scrapes, burns and other irritations. However, it does have the concomitant problem of the need to use two sets of electrodes and to change them periodically by soaking the coated electrodes in the cleaning solution. This is not a process desired by all swimming pool owners.

SUMMARY OF THE INVENTION

This invention is based upon the discovery that by using alternating electrical current between the silver/aluminum alloy electrodes in the rms voltage range of from as low as about 1.0 volts to as high as about 100 volts and preferably from about 25 to 35 volts with an alternation frequency of the potential of from about 50 to about 70 cycles per second and preferably about 60 cycles per second, the silver/ammonium alloy electrodes allow introduction of silver ions into the water without the attendant discoloration or staining problem of copper and in a continuous, unaltered concentration without the buildup of significant amounts of calcium on either electrode. Even more surprising is the fact that in such a situation, the calcium ions become agglomerated and come out of solution into dispersion of solid particles that, while not adhering to the electrodes, are capturable in the filtering medium used in the filter operation that is placed downstream from the electrodes. Thus, the electrodes remain free of coating and need not be changed or soaked in the cleaner, the amount of silver ions introduced into the water remains at a level sufficient to control algal and bacterial growth while not staining the containment walls and the water hardness is decreased by entrapment of the agglomerated calcium in the filter resulting in a softer water with its attendant beneficial effects on the human body. The use of two active electrodes instead of one active and one inert electrode allows for higher current densities and shorter electrical exposure times to the aqueous bodies resulting in a savings in electrical energy needed to control pollution. By maintaining the applied potential at the voltages and at the alternation frequencies set forth above, the utilization and erosion of both electrodes is average and they will not only last substantially longer but will remain free of coatings of calcium so as to be able to supply a constant stream of silver ions while at the same time concentrating calcium ions away from the electrode into particles of a size that are capturable by the filtering medium.

With respect to swimming pools, it is most efficacious to establish a closed loop of fluid flow from one portion of the swimming pool and return to another portion of the pool wherein the stream of water is forced between the electrodes so that the intervening electrical discharge kills the algal and bacterial growth present in the water stream, the electrodes issue silver ions into the water for travel back into the swimming pool to kill the algal and bacterial growth that is in the swimming pool that has not yet passed between the electrodes and the calcium is agglomerated in the water between the electrodes to a particle size sufficient to be captured by the filtering medium which is located down stream from the electrodes. The loop therefore takes algal and bacterial laden water with its calcium ions in solution and, after passage between the electrodes, directs it to a filtering medium where the dead algal and bacterial material and the agglomerated calcium are removed to produce a stream of algal and bacterial free water of a lower calcium content than had entered the electrode area so as to reduce the overall calcium content of the swimming pool and control the algal and bacterial growth therein.

Accordingly, the main object of this invention is a method of using active electrodes in an electrical potential impressed therebetween to control the growth of algae and bacteria and to eliminate the coating of the electrode with calcium in aqueous bodies and preferably swimming pools without the staining caused by the previously known use of copper ions. Other projects of the invention include a means of controlling the algal and bacterial content of aqueous bodies and swimming pools without the need to add chemicals, such as electrolytes and other potentially harmful salts and compounds, as well as without the need to maintain a separate set of electrodes for soaking in a solution to remove the buildup of calcium thereon; a method of controlling pollution that is free of the noxious fumes and the noxious tastes imparted to aqueous bodies and swimming pools by the normal addition of electrolytic compounds and salts; a means of controlling the growth of algae and bacteria in aqueous bodies and swimming pools wherein the electrodes undergo like ware and remain free of calcium coatings to provide for a longer lasting set of electrodes that do not need to be periodically cleaned of calcium coating; a method whereby the electrical exposure to the aqueous body or swimming pool is substantially less than through using higher current densities and two active electrodes in place of an active and an inert electrode as found in the prior art; and a method of controlling the algae growth, bacteria growth and calcium concentration ("hardness") in an aqueous body and a swimming pool that utilizes a shorter exposure time of alternating current with a concomitant savings in electrical energy. There and other objects of the invention will become more apparent upon reading the description of the preferred embodiment along with the drawings appended hereto. The scope of protection desired by the applicant may be gleaned from a fair reading of the claims that conclude this specification.

DESCRIPTION OF THE PREFERRED EMBODIMENT

Figure 1:
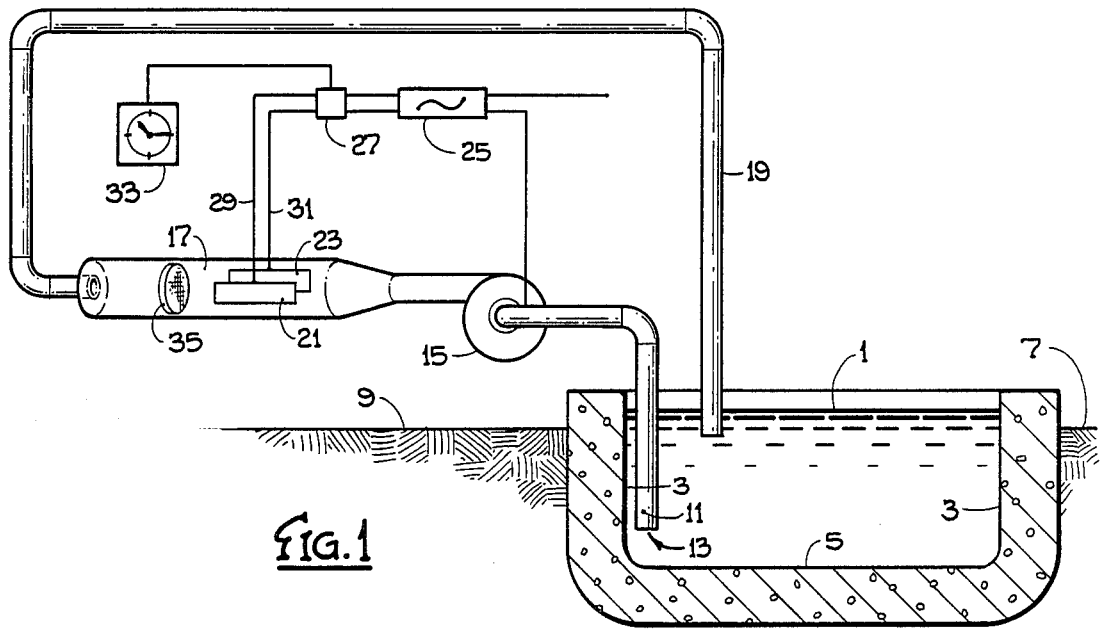
FIG. 1 is a schematic illustration of one embodiment of this invention utilized with swimming pools; and, FIG. 2 is an exploded view, partially in section and partially in schematic, of a portion of the embodiment shown in FIG. 1 showing how the calcium is generated into agglomerated particulate size for entrapment in the filter and the electrode kept clean during the depollution process.

As shown in FIG. 1, an aqueous body of water in the form of a swimming pool 1 is surrounded by sides 3 and bottom 5 that is set below ground level 7 in earth 9. A hollow dip leg 11 is positioned in pool 1 near the bottom thereof for conveying a stream of water 13 from pool 1 to a pump 15. Pump 15 conveys water stream 13 under pressure through a confined area 17 and thence through a return leg 19 to be reintroduced into pool 1.

Figure 2:
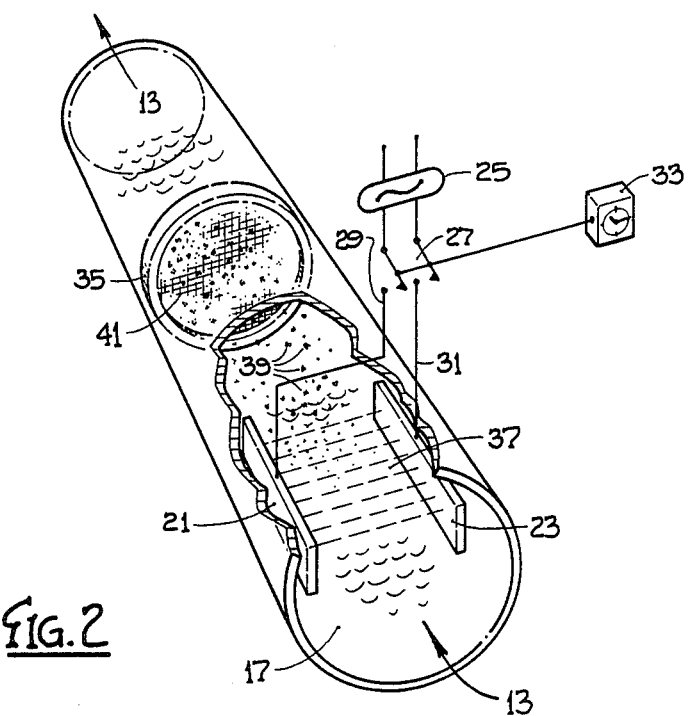

As shown generally in FIG. 1 and more specifically in FIG. 2, confined area 17 may be in the form of a pipe or other water-carrying conduit. Downstream from pump 15 are positioned a pair of electrodes 21 and 22 in spaced-apart relation such that water flow 13 passes therebetween on its path through enlarged area 17. Both electrodes 21 and 23 are active electrodes as opposed to inactive electrodes such as those made from silicon. Active electrodes preferred in this method are those that are substantially free of copper ions, to eliminate potential for staining of the container of swimming pool 1 such as the inner usually painted surfaces of sides 3 and pool bottom 5. It is preferred that electrodes 21 and 23 contain a major amount of aluminum or aluminum alloy, such as 95.0 to 99.5% by weight of aluminum or aluminum alloy and silver from about 0.5 to about 5.0% by weight. It has been found that this method requires too long of an electrical exposure when the amount of silver is less than about 0.5% by weight in the electrode. Conversely, in electrodes that contain more than about 5.0% by weight silver, there is a substantial initial cost that may be too great for many consumers and further such a high level of silver may release too many silver ions into the pool if the process is allowed to run too long. Also, such a high silver content may qualify the electrodes as potential targets for theft.

Electrodes 21 and 23 may be supported by any type of underwater or over-water support structure that will not interfere with the transmission of electrical power or interfere with the flow of stream 13 through confined area 17. Such support means may be rubber-coated, plastic or metal fittings that are commonly used and recognized in the prior art; they are omitted from FIGS. 1 and 2 for clarity. A source 25 of alternating current is provided and is attached through a relay or other connection means 27 via conductors 29 and 31 to the respective electrodes so that they may be impressed with voltages different from each other as well as to power pump 15. A convenient source of alternating electrolytic potential is common house current that would be passed through a transformer to change the output voltage therefrom from the value of the input voltage therefrom. For safety reasons, the transformer primary winding is shielded from the secondary winding and the shield is grounded so that should shorting occur, the circuit breaker or other protective device employed in the house current circuitry would trip and shut down all electrical potential delivered to the swimming pool as a means of preserving the safety to those in the immediate area.

It is preferred in this invention that the rms voltage of the alternating electrolytic potential carried in conductors 29 and 31 range from about 1 to about 100 volts and more specifically range from about 25 to about 35 volts. In addition, the frequency of alternation of the alternating electrolytic potential between electrodes 21 and 23 is preferred to be in the range of about 50 to about 70 cycles per second and more specifically about 60 cycles per second which happens to be the cycle in the American alternating power system used in homes.

A timer 33 is operatively connected to relay 27 for the purpose of turning relay 27 on and off and allow the alternating electrolytic potential to be transmitted from source 25 through relay 27 and conductors 29 and 31 to electrodes 21 and 23. Any desirable on and off timed program or schedule may be loaded into timer 33 to provide for an automatic depollution cycle of this inventive process. Typical, in a standard home swimming pool, a cycle of 3 to 5 hours per day is set in timer 33 and such an on and off pre-timed sequence will allow the inventive method to maintain the algal and bacterial pollution at an acceptably low level.

A filter 35 is placed in enlarged area 17 downstream from electrodes 21 and 23 for receipt of water flow 13 therethrough after it passes between electrodes 21 and 23. Filter 35 may be of any usable filter including a supported filter cloth, a series of filter stages that are filled with various sized particles of diatomaceous earth or activated charcoal or other filtering means. The purpose of the filter is to entrap particulate matter from stream 13 and return clear water to swimming pool 1.

When the alternating electrolytic potential impressed across electrodes 21 and 23 is maintained at an rms voltage as hereinbefore set forth and preferably in the range of 25 to 45 volts and when the frequency of alternation is maintained between the limits set forth above and more particularly at about 60 cycles per second, calcium that has been dissolved in the water in swimming pool one agglomerates as it passes through the electric field generated between electrodes 21 and 23, as shown by dotted lines 37 to form particulate matter 39 that is swept along with water stream 13 until it meets the filter medium 41 on filter 35 whereupon it is captured on said filter medium along with deadened algae and bacteria and held there for later removal along with the filter medium or through some other cleansing operation. The result is that water flow 13 is now substantially reduced in calcium content as well as algae and bacteria as it exits enlarged are 17 to continue its travel via return leg 19 back to swimming pool 1. Further, electrodes 21 and 23 remain free of a coating of the calcium particulate matter 39 that occasioned the operation when the electrolytic potential applied between electrodes 21 and 23 was under direct current or in an alternating current area outside of the voltage and outside of the alternating cycles set forth above.

What is claimed is:

1. An improved of controlling algal and bacterial pollution, as well as reducing the concentration of dissolved calcium, in an aqueous body of water, without the necessity of adding electrolytic thereto, comprising the steps of:
   (a) immersing a pair of spaced-apart electrodes in the aqueous body, said electrodes being chemically active, being substantially free of copper ions and made from mixtures of silver and aluminum alloy containing from about 0.5 to about 5.0 percent by weight silver and the balance being aluminum alloy; and
   (b) impressing between said electrodes an alternating electrolytic potential wherein the rms voltage ranges from about 1 to about 100 volts and the frequency of alternation of the potential ranges from about 50 to about 70 cycles per second to provide silver ions to enter the water and destroy the algal and bacterial pollution and to prevent said electrodes from becoming coated with free calcium.

2. The method of claim 1 wherein said rms voltage ranges from about 25 to about 35 volts.

3. The method of claim 1 wherein said frequency of alternation of the potential is about 60 cycles per second.

4. The method of claim 1 wherein said rms voltage ranges from about 25 to about 35 volts and said frequency of alternations is 60 cycles per second.

5. An improved method of controlling algal and bacterial pollution, as well as reducing the concentration of dissolved calcium in a swimming pool, without the necessity of adding electrolytes thereto, comprising the steps of:
   (a) conveying a stream of water from the swimming pool to an enclosed area and back to the pool;
   (b) providing a pair of spaced-apart electrodes in said enclosed area through which the water is to pass, said electrodes being chemically active, being substantially free from copper ions and made from mixtures of silver and aluminum alloy containing from about 0.5 to about 5.0 percent by weight silver and the balance being aluminum alloy;
   (c) providing a filter downstream from said electrodes in said enclosed area for filtering the water as it passes from said electrodes and before it returns to the swimming pool, and,
   (d) providing a source of alternating electrolytic potential to said electrodes to generate an energy field through said water stream between said electrodes including providing means to turn the potential on and off in accordance with a preselected schedule,- wherein said rms potential ranges from about 1 to about 100 volts and the frequency of said alternations ranges from about 50 to about 70 cycles per second, to provide silver ions to the water and destroy the algal and bacterial pollution and to further agglomerate the calcium ions in the water to a size wherein they will not cost the electrodes but be carried with the water stream to said filter and removed from the water.

6. The method of claim 5 wherein said rms voltage ranges from about 25 to about 35 volts.

7. The method of claim 5 wherein said frequency of alternation of the potential is about 60 cycles per second.

8. The method of claim 5 wherein said rms voltage ranges from about 25 to about 35 volts and said frequency of alternations is 60 cycles per second.

* * * * *